Nov. 17, 1925.

G. W. PICKARD 1,561,483

DISTINGUISHING DIELECTRIC SHEETS

Filed April 23, 1920

INVENTOR
Greenleaf Whittier Pickard

Patented Nov. 17, 1925.

1,561,483

UNITED STATES PATENT OFFICE.

GREENLEAF WHITTIER PICKARD, OF NEWTON, MASSACHUSETTS, ASSIGNOR TO WIRELESS SPECIALTY APPARATUS COMPANY, OF BOSTON, MASSACHUSETTS, A CORPORATION OF NEW YORK.

DISTINGUISHING DIELECTRIC SHEETS.

Application filed April 23, 1920. Serial No. 376,131.

*To all whom it may concern:*

Be it known that I, GREENLEAF W. PICKARD, a citizen of the United States, residing at Newton, in the county of Middlesex and State of Massachusetts, have invented certain Improvements in Distinguishing Dielectric Sheets, of which the following description, in connection with the accompanying drawings, is a specification, like reference characters on the drawings indicating like parts in the several figures.

This invention relates to method and apparatus for distinguishing bad from good insulating or dielectric sheets and will be herein disclosed in connection with dielectric sheets which are to be used in making electrical condensers of the stack type. Inasmuch as the necessity for distinguishing and selecting such sheets arises more particularly where mica sheets are used as the dielectrics for such condensers, the invention will be described with particular reference to mica sheets, altho it is to be understood that the invention can be employed in distinguishing good and bad sheets of dielectric material other than mica.

The process of preparing mica elements for assembly with tin foil or other conducting elements to form a condenser stack, includes the splitting of the mica into sheets of the required thickness and the dieing out or cutting of these sheets to the required shape and dimensions. Since mica is frail mechanically it happens very frequently that a sheet which appears to the eye to be perfect nevertheless contains a hole or some flaw or imperfection which renders it unsuitable for use in the condenser. If one of these defective mica elements is included in the condenser it will permit an electrical discharge through the hole or other imperfect portion and this discharge will short circuit, and therefore ruin, the entire condenser. Such a condenser break-down may be caused by a hole through the mica sheet so small as to be invisible and its presence, therefore, may not be detected until the condenser is tested after practically all of the manufacturing operations on it have been completed.

The invention comprises a method and apparatus for distinguishing good mica sheets from similar micas possessing minute defects not readily observable, thereby permitting selection of good sheets before they are assembled with the other elements of the condenser so that any imperfect mica elements, which later might produce a failure or break-down in the condenser, will be eliminated before the assembling operation has been begun.

The nature of the invention will be readily understood from the following description when read in connection with the accompanying drawings, in which—

Figures 3, 4:
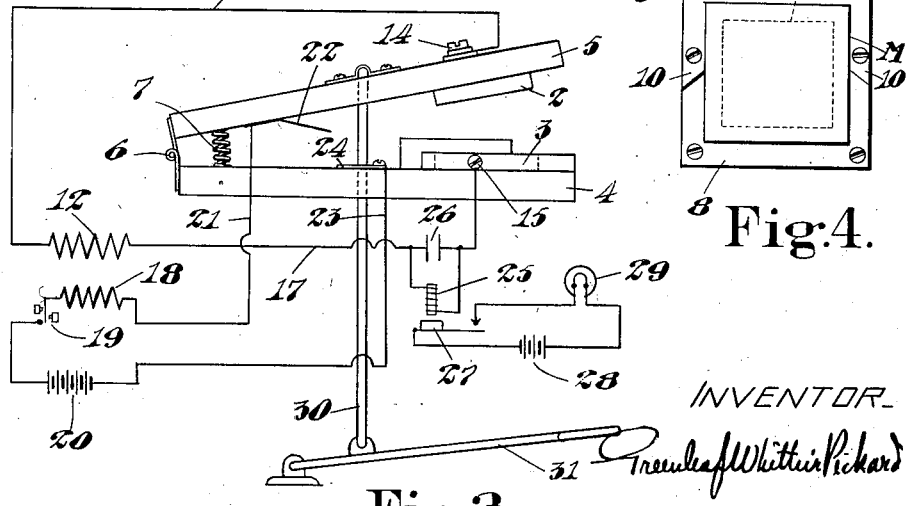
Fig. 3 is a diagrammatic view showing the electrical connections for the apparatus shown in Figs. 1 and 2.
Fig. 4 is a plan view of a portion of the apparatus showing a mica element in position to be tested.

The apparatus shown comprises upper and lower metallic contacts 2 and 3, respectively, designed to engage simultaneously the opposite faces of a mica element M, Fig. 4, of a condenser. The entire surface of one of these mica elements is not under a dielectric strain when it is in a condenser, but only the central portion designated at $m$, Fig. 4. That is, a margin of substantial width is provided around the entire "active" surface $m$ which assists in preventing the current from jumping around the edge of the mica sheet between the conducting elements in contact with the opposite faces of said sheet. It is necessary, therefore, to test the dielectric strength merely of the area $m$ of the mica sheet M, and for this reason the mica contacting faces of the metal blocks or members 2 and 3 are made of an area equal to the area $m$ and when engaging the insulating sheet are insulated from each other by the projecting margin of the sheet.

The lower block 3 is secured to the upper surface of a base 4 made of suitable insulating material such, for instance, as bakelite, vulcanite, fibre or the like, while the upper block 2 is secured fast to an arm 5 also made of material similar to that of which the base 4 consists. The rear ends of the parts 4 and 5 are secured together by a hinge 6. The base 4 rests on, or is secured to, a table or other suitable support and the arm 5 swings toward or from this member. The arm is held in its raised position by means of a coiled spring 7 interposed between the base 4 and the arm 5.

Figure 1:
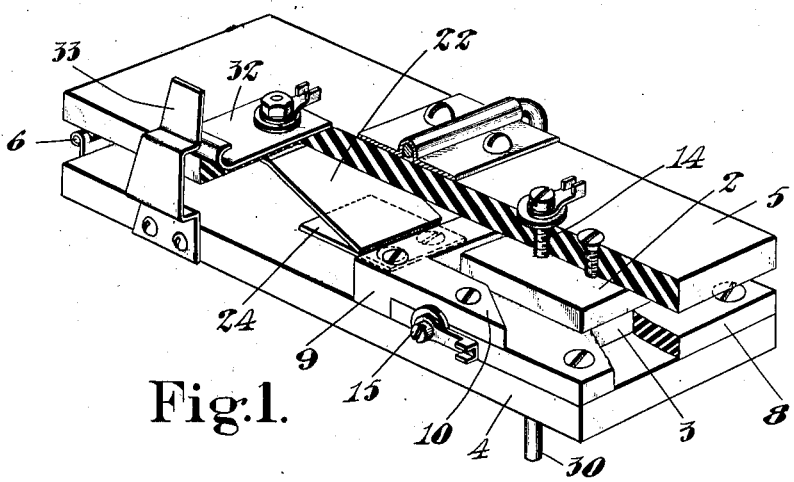
Figure 1 is a perspective view of a portion of an apparatus embodying the present invention, certain parts being broken away for the purpoe of disclosing more clearly the details of construction.
Figure 2:
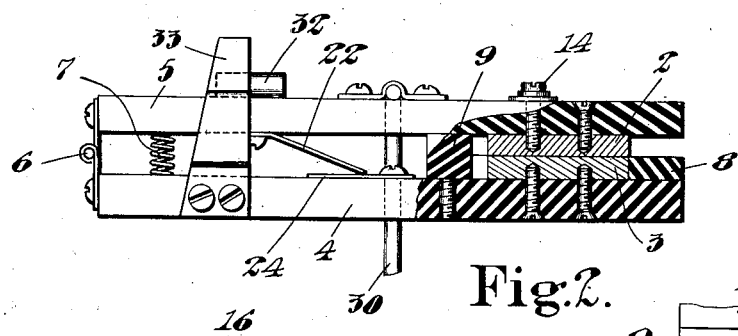
Fig. 2 is a side elevation, partly in cross section, of the device shown in Fig. 1.

The lower block 3 is enclosed on three sides by a U-shaped piece 8 of insulating material secured to the base 4, and another U-shaped piece of insulation 9 is secured across the base at the rear ends of the arms of the part 8 and is itself provided with arms 10—10 that extend forward and overlie the arms of the part 8, as clearly shown in Figs. 1 and 4. The upper surface of the insulating piece 8 is flush with the upper surface of the lower block 3, while the part 9 projects above this surface and its inner wall is spaced from the block 3 by a distance equal to the width of the margin between the active surface $m$ of the mica sheet and the edge of this sheet. This insulating member 9, therefore, provides a gage to assist in positioning the sheets M of mica properly for the testing operation.

The blocks 2 and 3 are connected in a high potential circuit of any suitable character, shown as the secondary 12 of an induction coil or transformer, and these members form the terminals for this circuit. For convenience in making the electrical connections one of the screws 14, which secures the upper block 2 to the arm 5, is utilized as a binding post, while another binding post 15 projects through a hole in the edge of the insulating piece 8 and is threaded into the lower block 3. Conductors 16 and 17, Fig. 3, connect the opposite terminals of the secondary coil 12 to the respective binding screws 14 and 15.

The primary circuit for this high potential circuit comprises a primary coil 18, vibrator 19, battery 20, a conductor 21 which connects one terminal of the primary coil to a spring conductor 22 secured to the arm 5, and another conductor 23 which connects one terminal of the battery 20 with a contact plate 24 secured fast to the base 4. It will now be clear that normally the primary circuit is open but that when the arm 5 is lowered to bring the block 2 in contact with a sheet of mica properly supported on the block 3, this circuit will be closed by the engagement of the spring plate 22 with the stationary plate 24. The intermittent current flowing through the primary circuit, due to the presence of the vibrator 19, produces a high potential current in the secondary 12 of the induction coil, which potential is impressed on the mica sheet between the blocks 2 and 3.

If the sheet M has no defects causing it to be unsuitable as a condenser sheet, nothing happens. If, however, there is a flaw in the sheet, or if for any other reason it breaks down, a current will flow through the secondary circuit and through such flaw and this flow of current may be utilized to operate a signal. That is, a relay coil 25 is connected in the conductor 17 and is shunted by a condenser 26, and this relay when energized raises an armature 27 which closes a signal circuit including a battery 28 and an electric lamp 29. The lighting of the lamp, therefore, indicates to the operator that the mica sheet is defective at some point or other. The sheets that do not so survive the test are discarded.

For convenience in moving the upper block 2 into engagement with the mica sheet on the block 3, the arm 5 is connected by a link 30 with a foot treadle 31, Fig. 3, so that by stepping on the treadle the block 2 is brought down upon the block 3. As soon as the treadle is released the arm 5 is raised by the spring 7, and the upward movement of the arm under the influence of this spring is yieldingly arrested by the engagement of a plate 32 secured to the arm and provided with a curved end that engages the upper inclined part of a spring plate 33 secured to the base 4.

It will now be understood that in order to distinguish from good and bad mica sheets it is merely necessary for the operator to place them one at a time in the gage 9 and then step on the treadle 31 which not only brings the upper block 2 down upon the sheet but also closes the primary circuit and thus impresses a high potential across the area $m$ of the mica sheet. If the sheet is defective, that fact is indicated at once by the lighting of the lamp 29.

It should be particularly noted that the provision of a switch in the primary circuit arranged to be operated by the relative movement of the blocks 2 and 3 into mica engaging position is of advantage not only in saving power, but also in that, due to this arrangement, the terminals 2 and 3 are "dead" at the time that the operator is placing a mica sheet in position to be tested and removing it therefrom. Consequently, this arrangement avoids any liability of the operator receiving a shock while she is handling the mica sheets. The diverging faces of the parts 10—10 assist the operator in placing the sheets of mica in the gage 9.

It will also be appreciated that the embodiment of the invention herein described and illustrated may be modified in many particulars without departing from the spirit or scope of this invention. For instance, it is contemplated that instead of using flat faced blocks 2 and 3 to engage the mica sheets, metallic rolls may be substituted for them, each of these rolls being of a length equal to one dimension of the active area $m$ of the mica sheets to be tested. It will also be understood that while the dielectric or insulating material to be acted on has been herein referred to as "mica" any other dielectric material is the equivalent of mica for the purposes of this invention.

What is claimed as new is:

1. A mica testing apparatus comprising, in combination, upper and lower metallic blocks for engaging simultaneously opposite faces of a sheet of mica, supporting means for said blocks for relatively moving them into and out of engagement with a mica sheet, gaging means associated with the lower block for facilitating the positioning of a mica sheet properly between said blocks, a a high potential circuit connected to said blocks and for which said blocks form terminals, and a signal operatively connected with said high potential circuit to be operated upon a flow of current therethrough.

2. A mica testing apparatus comprising, in combination, upper and lower metallic blocks for engaging simultaneously opposite faces of a sheet of mica, supports for said blocks, foot operated means for relatively moving said supports to cause said blocks to engage a sheet of mica placed between them, a spring normally operative to hold said blocks apart, a high potential circuit connected with said blocks and for which the blocks form terminals, and a signal operatively connected with said circuit and arranged to be operated upon a flow of current through said circuit.

3. A mica testing apparatus comprising, in combination, upper and lower metallic blocks for engaging simultaneously opposite faces of a sheet of mica, supports for said blocks, foot operated means for relatively moving said supports to cause said blocks to engage a sheet of mica placed between them, a spring normally operative to hold said blocks apart, a high potential circuit connected with said blocks and for which the blocks form terminals, a primary circuit for supplying power to said high potential circuit, and a switch controlling said primary circuit and comprising two members secured to said respective supports whereby said switch closes the primary circuit when said blocks are relatively moved into mica engaging position, and breaks said primary circuit when the blocks are relatively moved in the opposite direction.

4. Apparatus for distinguishing good thin mica sheets from similar micas possessing minute defects not readily observable, all such thin mica sheets being cut to have a margin beyond the sheet area designed to be electrostatically active in the condenser stack and being by such cutting liable to have defective points not readily observable, said apparatus comprising two electrically conducting members having surfaces adapted to engage the opposite active areas of individuals of such mica sheets, said conducting members being insulated from one another by a surface of said margin of an intervening mica; means for moving the surface of one of said conducting members into engagement with the surface of a mica the other surface of which is engageable by the other conducting member, and for reversing such movement to permit insertion of individual mica sheets between said conducting members; and means subjecting said conducting members to such potential difference as to cause a current flow through the defective point of a mica having such point and engaged by said conducting members, but not to puncture a good mica steet so engaged but having no such defective point.

5. Apparatus for distinguishing good thin mica sheets from similar micas possessing minute defects not readily observable, said apparatus comprising a pair of supports of insulating material; a pair of electrically conducting members respectively supported thereby, and having surfaces adapted to engage opposite faces of individual mica sheets; means for relatively moving said conducting surfaces into and out of position engaging opposite faces of the mica sheet; the micas and said insulating supports insulating said conducting members from one another save at defective points of the micas; and means subjecting said conducting members to such potential difference as to cause a current flow through a defective point of a mica having such point and engaged by said conducting members, but not to puncture a good mica sheet so engaged but having no such defective point.

6. Apparatus for distinguishing good thin mica sheets from similar micas possessing minute defects not readily observable, said apparatus comprising a pair of electrically conducting members adapted to engage opposite faces of such thin micas as individuals; electrical means subjecting said conducting members to such potential difference as to cause a current flow through the defective point of a mica having such point and engaged by said conducting members, but not to puncture a good mica sheet so engaged but having no such defective point; means relatively moving the mica-engaging surfaces of said conducting members to and from one another; a switch for said electrical means; and means controlled by the operation of said moving means, for operating said switch.

7. Apparatus for detecting flaws in dielectric sheets, which comprises a pair of electrically conducting members constituting circuit terminals having sufficiently wide continuous conducting surface areas to engage continuously substantial widths of the intervening sheet insulation under test;

means for causing engagement and release of said intervening sheet by and from said terminals; a testing circuit connected to said terminals; and controlling means for said circuit arranged to be operated by the relative movements of said sheet and terminals into and out of engaging position to apply and cut off the testing potential respectively.

8. Apparatus for distinguishing good thin mica sheets from similar micas possessing minute defects not readily observable, said apparatus comprising a pair of electrically conducting members adapted to engage opposite faces of individual thin micas; electrical means subjecting said conducting members to such potential difference as to cause a current flow through a defective point of a mica having such point and engaged by said conducting members, but not to puncture a mica sheet so engaged but having no such defective point; means relatively moving the mica-engaging surfaces of said conducting members to and from one another; and a switch for said electrical means and operated by said moving means.

9. The method of detecting flaws in dielectric sheets, which consists in causing continuous engagement with the opposite surfaces of such sheet, of a pair of electrically conducting members constituting circuit terminals having sufficiently wide continuous conducting surface areas to engage continuously substantial widths of the opposite surfaces of the insulating sheet between them; impressing a testing electrical potential difference between said terminals for test after the insulating sheet has been placed in its testing location with respect to at least one of said terminals; and discontinuing the application of such potential difference after the test and before removal of the sheet from its testing location with respect to at least one of the terminals.

10. Apparatus for distinguishing good thin mica sheets from similar micas possessing minute defects not readily observable, said apparatus comprising a pair of electrically conducting members having surfaces adapted to engage opposite faces of such individual thin micas; means subjecting said conducting members to such potential difference as to cause an electric current flow through a defective point of a mica having such point and engaged by said conducting members, but not to puncture a mica sheet so engaged but having no such defective point; an electric lamp; and means operating said lamp and controlled by said flow of current through a defective point of a mica.

11. Apparatus for distinguishing good thin mica sheets from similar micas possessing minute defects not readily observable, said apparatus comprising a pair of electrically conducting members having surfaces adapted to engage opposite faces of such individual micas; means subjecting said conducting members to such electrical potential difference as to cause a current flow through a defective point of a mica having such point and engaged by said conducting members, but not to puncture a mica sheet so engaged but having no such defective point; and apparatus permitting distinguishing of micas having such defective points from micas not having such defective points, said apparatus being operated by said flow of current through a defective point of a mica having the same.

12. Apparatus for distinguishing good thin mica sheets from similar micas possessing minute defects not readily observable, such mica sheets having a narrow margin beyond the area of the sheet designed to be electrostatically active in an electrical condenser stack, said apparatus comprising two substantially horizontal conducting members having surfaces adapted to engage the active areas of the micas but constructed to be insulated from one another by a marginal surface of an interposed mica; means for imparting relative movement to the sheet-engaging surfaces of said conducting members to cause them to be engaged with and disengaged from the opposite faces of a mica; and means subjecting said conducting members to such potential difference as to cause an electric current through a defective point of a mica having such point and engaged by said conducting members, but not to puncture a mica so engaged but having no such defective point.

13. Automatically-operating apparatus for detecting flaws in dielectric sheets, which comprises a pair of electrically conducting members constituting circuit terminals having sufficiently wide continuous conducting surface areas to face continuously substantial widths of the opposite surfaces of intervening sheet insulation under test; a high potential electric circuit for said terminals; and controlling means for said circuit operated by relative terminal-and-sheet engaging movement.

14. Apparatus for distinguishing good thin mica sheets from similar micas possessing minute defects not readily observable, said apparatus comprising two substantially horizontal conducting members having surfaces adapted to engage the faces of individual micas; means imparting relative movement to the sheet-engaging surfaces of said conducting members to cause them to engage with and be disengaged from the opposite faces of a mica; and means subjecting said conducting members to such potential difference as to cause an electric current flow through a defective point of a mica having such point and engaged by such conducting members, but not to puncture a mica so engaged but having no such defective point.

15. Apparatus for detecting flaws in dielectric sheets, which comprises a pair of electrically conducting members constituting circuit terminals having sufficiently wide continuous conducting surface areas to face continuously substantial widths of the opposite surfaces of intervening sheet insulation under test; and means for applying a high electrical potential difference between said terminals in their insulation-facing positions; one of said terminals having a width less than said sheet insulation whereby the edges of the insulating sheet in testing position extend a limited distance beyond the sides of the terminal; the other terminal being provided with means for centralizing the insulating sheet with respect to said first terminal.

16. The method of distinguishing good thin mica sheets from similar micas possessing minute defects not readily observable, consisting in placing such micas successively between a pair of electrically conducting members, insulating said members from one another save at defective points of such micas possessing such points; and establishing such a potential difference on said conducting members as to cause an electric current flow through a defective point of a mica having such point, but not to puncture a mica placed between the conducting members but having no such defective point.

17. The method of obtaining mica sheets suitable as dielectrics for high potential stack condensers, which consists in taking thin split micas which have been cut to shape for such condenser sheets and therefore are liable to have defective points not readily observable; subjecting such portions of opposite faces of such micas as are to constitute the active areas in the condenser, to such a potential difference as to cause an electric current flow through a defective point of a mica having such point, but not to puncture a mica having no such defective point; and selecting as condenser sheets the micas through which no such current so flows.

In testimony whereof I have signed my name to this specification.

GREENLEAF WHITTIER PICKARD.